United States Patent [19]

De Graan

[11] 4,292,876
[45] Oct. 6, 1981

[54] WASHER

[76] Inventor: Henry R. De Graan, 20520 Walnut Ave., Walnut, Calif. 91789

[21] Appl. No.: 63,269

[22] Filed: Aug. 2, 1979

[51] Int. Cl.³ ............................................. F16B 43/00
[52] U.S. Cl. .................................... 411/542; 411/369; 411/901
[58] Field of Search .................. 85/1 JP, 9 R, 50 R, 85/50 C; 151/38; 277/234, 228, 166, 189

[56] References Cited

U.S. PATENT DOCUMENTS

| | | | |
|---|---|---|---|
| 2,927,495 | 3/1960 | Barwood | 85/50 R X |
| 3,153,971 | 10/1964 | Lovisek | 85/1 JP |
| 3,160,054 | 12/1964 | Cohen et al. | 85/1 JP |
| 3,452,636 | 7/1969 | Cohen et al. | 85/1 JP |
| 3,670,618 | 6/1972 | Jellison | 85/1 JP |
| 3,882,752 | 5/1975 | Gutshall | 85/1 JP |
| 4,102,239 | 7/1978 | Dallas | 151/38 X |

Primary Examiner—Ramon S. Britts
Attorney, Agent, or Firm—Edgar W. Averill, Jr.

[57] ABSTRACT

An improved steel and neoprene bonded washer having a crowned steel washer with an inner elastomeric washer. The elastomeric washer is adjacent to the concave surface of the crowned washer. The steel washer has a generally flat outer ring and a conical portion extending from the outer ring toward the central opening. The angle of the sides of the conical portion is between 30° and 50° with respect to the flat portion.

6 Claims, 6 Drawing Figures

WASHER

BACKGROUND OF THE INVENTION

The field of the invention is washers, and the invention relates more specifically to washers of the type typically used in the construction or assembly of metal structures. Such washers are usually held to a hex head screw and are designed for use where the screw head and washer are exposed to weathering Commonly used washers for this use typically have either a flat or domed washer with a separate or bonded neoprene or other elastomeric washer positioned on the side of the washer away from the screw head. When the screw and washer assembly is tightened, the elastomeric washer expands and helps prevent water leakage around the washer. Although a flat washer could be used with a bonded or unbonded elastomeric washer, it has been found preferable to use a domed or dished washer so that the elastomeric washer tends to be forced inwardly against the shank of the screw. This helps eliminate leakage between the screw and the elastomeric washer.

With increased labor costs, there is a continual search for ways to speed up the construction of buildings and other objects. One way of increasing efficiency has been to asssemble the screw and washer so that the user does not have to join these two elements during use. Also, since the elastomeric portion of the washer should always be adjacent the metal surface through which the screw is driven, preassembly eliminates the possibility of reversal of the washer. The assembled screw and washer is typically driven with an electric or pneumatic screwdriver of the type having a preset or adjustable amount of torque using an overruning clutch. In use, the screw head is inserted into the driving portion of the screwdriver and the point of the screw is inserted through a predrilled hole or in the event the screw is of the type having an integral drill, the point of the screw is placed in the desired location and the screwdriver is started. The screw will be driven until the torque reaches the preset level for the screwdriver. At this point, the clutch of the screwdriver will slip and the operation is complete.

Frequently, the amount of torque generated by the screwdriver exceeds the desired amount. In the past with a domed washer, occasionally the amount of torque exerted on the washer would indent the center section and cause the neoprene inner washer to spin out or otherwise tear away from the screw. This resulted in a leak and the liklihood of corrosion. A washer is therefore needed which can accept higher torque without causing the washer to tear away from the screw. Furthermore, undertorquing has led to an improper seal with presently used washers and there is a need for a washer capable of forming a water-tight seal with less than normal torque. Undertorquing is a particularly common problem when two sheets are being stitched.

SUMMARY OF THE INVENTION

It is an object of the present invention to provide a crowned washer having an elastomeric inner washer which assembly is capable of accepting a large amount of torque without loss of the inner elastomeric washer.

The present invention is for an improved steel and neoprene bonded washer of the type having a crowned steel washer with an elastomeric washer adjacent the concave surface of the crowned washer. The improvement comprises a steel washer having a generally flat outer ring and a conical portion extending from the flat outer ring toward the central opening. The angle of the sides of the conical portion are between 30° and 50° and the flat portion is between 15% and 33% of the outside diameter of the washer. An elastomeric inner washer is bonded to the concave surface of the steel washer.

DESCRIPTION OF THE PREFERRED EMBODIMENTS

Figure 1:
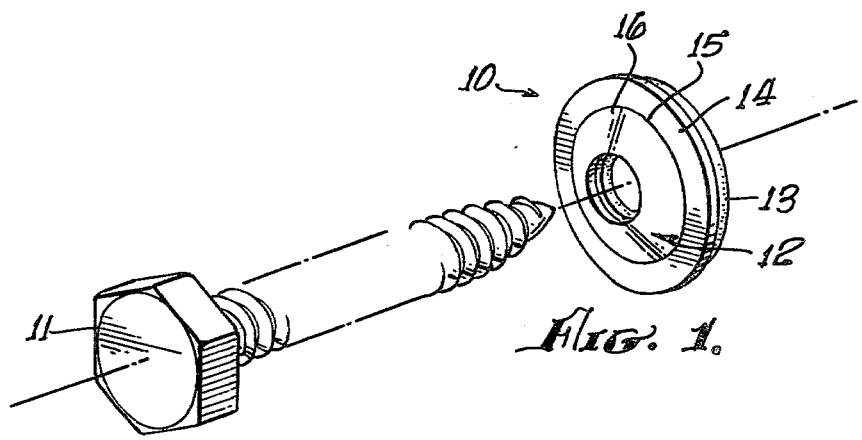
FIG. 1 is an exploded view of the washer of the present invention and a screw for use therewith.
Figure 2:
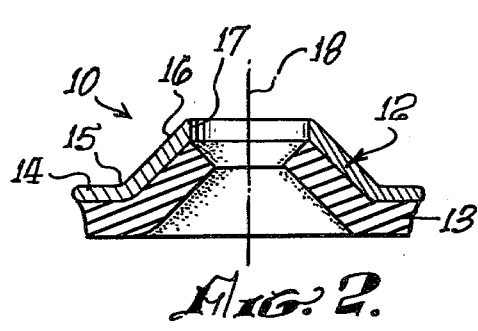
FIG. 2 is a cross-sectional view of the washer of the present invention.

An improved steel and neoprene bonded washer 10 is shown in perspective view in FIG. 1 together with a hex head steel screw 11. As shown best in FIG. 2, washer 10 has a steel washer 12 and an elastomeric washer 13 such as a neoprene washer. Washer 13 is preferably bonded to steel washer 12. This bonding may be carried out by vulcanizing an uncured neoprene washer to the steel washer. Alternatively, conventional cements or adhesives may be used to create the bond. The neoprene or other elastomeric sheet may be bonded either before or after cutting the washer or washers from the steel. The steel for the washer of the present invention may be conventional and typically is made of 20 gauge steel. The neoprene or other elastomeric layer is typically approximately 70/1000 of an inch thick although different thicknesses may be used for the different applications.

Figure 6:
FIG. 6 is a cross-sectional side elevation of the prior art dished washer having a screw inserted into a workpiece.

The washer of the present invention has exhibited an improved resistance to destruction of the neoprene washer when the bolt and washer assembly is over-torqued. With the increased desire to improve efficiency, various automatic screwdriving tools are commonly used which are supposed to limit the amount of torque applied on a screw during assembly of a structure such as a steel building. In practice, however, such automatic screwdrivers occasionally malfunction in the amount of torque applied to the screw. When this happens, washers, such as prior art washer 20 being made of a steel dished washer 21 bonded to a neoprene washer 22, may deform and cause the neoprene washer to be expelled as shown in FIG. 6. Thus the over torquing of screw 23 causes a reverse dishing of washer 21 which tends to force neoprene washer 22 away from screw 23 when screw 23 is tightened into steel sheets 24 and 25. The amount of dishing or beveling of steel washer 21 and other typical prior art dished washers is from 10° to 15° with respect to the horizontal.

Figure 3:
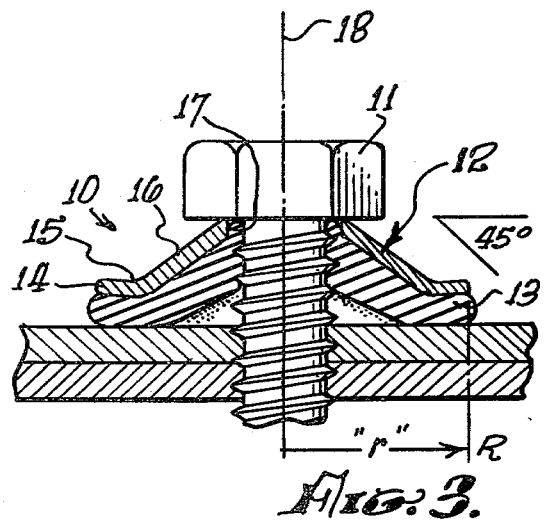
FIG. 3 is a cross-sectional view of the washer of present invention together with a screw and workpiece partially broken away.

In contrast, the washer of the present invention, as shown best in FIG. 3, has a flat portion indicated generally by reference character 14 which extends from the outside diameter of steel washer 12 to the intersection 15 between the flat portion 14 and conical portion 16. Conical portion 16 extends from intersection 15 to the inside diameter 17 of washer 12.

The size of the flat portion 14 forms an important part of the present invention. The central axis of steel washer 12 is indicated by reference character 18 and the radius from axis 18 to intersection 15 is indicated by the character "r". The radius between axis 18 and the outside diameter of washer 12 is indicated by the character "R". Radius "r" should be between 67% and 85% of "R". Stated differently, the flat portion should be between 15% and 33% of the outside diameter of the washer and preferably about 25%. Flat portion 14 should extend over the elastomeric washer 13 so that as screw 11 is tightened, flat portion 14 flattens and deforms the outer edge of washer 13.

Another important feature of the present invention is the angle of the conical portion 16 with respect to the horizontal. This angle should be between 30° and 50° and preferably about 45°. This conical portion 16 tends to cause washer 13 to be deformed inwardly against the threads of screw 11 and prevent leakage between washer 13 and screw 11.

It has been discovered that approximateldy 20% additional torque can be exerted on screw 11 without the spinning out or other impairing of the function of elastomeric washer 13. The washer is very effective in forming a tight seal where two metal sheets are being stitched together. In such instances, the threads of the screw tend to pull the sheets inwardly toward the concave portion of the cone and against the neoprene washer forming a particularly effective seal even with low torque.

Figure 4:
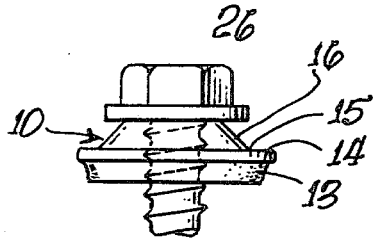
FIG. 4 is a side view of the washer of the present invention with a flanged bolt inserted therethrough.
Figure 5:
FIG. 5 is a cross-sectional side elevation of a prior art dished washer.

The washer of the present invention is particularly useful for high volume production in that the elastomeric washer such as washer 13 extends inwardly beyond the inside diameter of steel washer 12 and tends to hold on to steel screw 11. Thus the user need not insert the washer over the screw during use but instead is provided with a washer and screw assembly. The washer of the present invention can also be used with a flanged bolt 26 as shown in FIG. 4.

While the term "neoprene" has been used herein, other elastic sealants may be used in its place as long as the appropriate hardness and weather-ability are present. Likewise, while steel is referred to as the preferred material of construction for washer 12 other materials having an appropriate strength and corrosion resistance could also be used.

The present embodiments of this invention are thus to be considered in all respects as illustrative and not restrictive; the scope of the invention being indicated by the appended claims rather than by the foregoing description. All changes which come within the meaning and range of equivalency of the claims therefore are intended to be embraced therein.

What is claimed is:

1. An improved steel and neoprene bonded washer of the type having a crowned steel washer having an elastomeric washer adjacent the concave surface of the crowned washer, wherein the improvement comprises:

a steel washer having a generally flat outer ring and a conical portion extending from the flat outer ring to an opening at the center thereof, the angle of the sides of said conical portion being between 30° and 50°, said conical portion meeting the undersurface of the head of the screw with which it is used at an angle of between 30° and 50°, and wherein the flat portion is between 15% and 33% of the outside diameter of the washer; and an elastomeric washer bonded to the concave surface of the steel washer, said elastomeric washer having an outside diameter which extends under a portion of said flat outer ring.

2. The improved washer of claim 1 wherein the angle of said conical portion is about 45°.

3. The improved washer of claim 1 wherein said flat portion is about 25% of the outside diameter of the washer.

4. The improved washer of claim 1 wherein the inside opening in the elastomeric washer is smaller than the opening in the steel washer.

5. The improved washer of claim 4 further including a screw passing through the opening in the steel washer and passing through the opening in the elastomeric washer, the outside diameter of the screw being larger than the inside diameter of the elastomeric washer.

6. The improved washer of claim 1 wherein said elastomeric washer is a neoprene washer.

* * * * *